United States Patent [19]

Deffeyes

[11] 3,965,046

[45] June 22, 1976

[54] PROCESS OF MAKING METAL POWDERS AND PRODUCTS PRODUCED THEREBY

[75] Inventor: Robert J. Deffeyes, Arlington, Tex.

[73] Assignee: Graham Magnetics Incorporated, Graham, Tex.

[22] Filed: Sept. 26, 1974

[21] Appl. No.: 509,468

[52] U.S. Cl. .............................. 252/472; 75/.5 A; 75/.5 AA; 148/105
[51] Int. Cl.² ..................... B01J 23/74; C22B 23/04
[58] Field of Search ...................... 252/472, 62.55; 75/.5 AA, .5 BA, .5 A; 148/105; 23/273 SP, 301 R

[56] References Cited
UNITED STATES PATENTS

| | | | |
|---|---|---|---|
| 2,592,321 | 4/1952 | Neel | 75/.5 AA |
| 3,190,748 | 6/1965 | Landgraf | 252/62.55 X |
| 3,773,693 | 11/1973 | Calcagno et al. | 252/476 X |

*Primary Examiner*—W. J. Shine
*Attorney, Agent, or Firm*—Cesari & McKenna

[57] ABSTRACT

This invention relates to a process for making metal-bearing powders from the decomposition of organometallic salts, e.g. the thermal reduction of metal oxalates to metal. It has been discovered that improved properties can be achieved in metal particles so formed by a process whereby the growth of the organometallic salt to be subject, eventually, to thermal decomposition is initiated by use of seeds of a first salt different in chemical composition from another material to be formed thereon as the salt crystal grows.

30 Claims, 5 Drawing Figures

PROCESS OF MAKING METAL POWDERS AND PRODUCTS PRODUCED THEREBY

BACKGROUND OF THE INVENTION

There are many known procedures for producing small particles. Such particles are used in numerous applications including those using magnetic pigments and metallic catalysts.

One of the major processes in making small particles is that utilizing organometallic salts such as metal formates, oxalates and the like. These salts are usually thermally reduced to form metals. Occasionally, they may be further processed to produce the oxide of the metal moiety, e.g. to produce iron oxide, alumina or the like.

An improvement in this kind of process is described by Ehrreich and Reti in U.S. Pat. applications Ser. Nos. 228,387 now U.S. Pat. No. 3,892,673 and 367,461 now U.S. Pat. No. 3,843,349 filed Feb. 22, 1972, and June 6, 1973, respectively. The most important aspect of this work is the achievement of improved magnetic properties based on the use of a coating of an organic film-forming material on the particulate organometallic salt before it was subjected to reduction. A number of other workers including Haines, in U.S. Pat. No. 3,574,685 and Neel, in U.S. Pat. No. 2,651,105, have described work in this general field of organometallic salt reduction.

Other important work in this field is described in commonly-owned and co-pending U.S. Pat. application Ser. No. 509,467, filed Sept. 26, 1974 filed by Deffeyes on even date herewith and entitled HIGH POROSITY MATERIALS. In that application, it is shown that the Ehrreich-Reti technology can be improved to provide an important class of highly porous materials.

Also noted herein is a major advance, one made subsequently to the instant invention, disclosed in U.S. Pat. No. 3,909,240 filed on Sept. 28, 1973 by Deffeyes and Tyler et al. This is the use of complexing agents in the formulation of oxalates. Some advantageous structural characteristics imparted by use of the complexing agents to the organometallic salt survive the catastrophic decomposition of the salt and promote formation of metallic particles of particularly favorable magnetic chracteristics.

This latter process is mentioned here only because it, like the Ehrreich-Reti art, and the aforesaid Deffeyes art, is often used in the more advantageous embodiments of the instant invention to optimize the particulate material produced thereby.

In any event, at the time the instant invention was made, it remained a major problem in the art of making metallic powders to achieve a process whereby very small metallic particles could be manufactured which particles exhibit an improved combination of chemical stability and excellent magnetic properties or excellent catalytic properties.

After the invention to be described below was made, a hindsight review of the art relating to seeding was carried out. It was known to promote the crystallization in solution by adding seed crystals. The uniformity of refined sugar particles has long been promoted by use of sugar seed crystals. Moreover, sulfateprocess $TiO_2$ particles have been influenced in size and shape by the introduction of seed crystals into the reaction medium. These are examples of processes wherein the seed crystal is introduced primarily for the purpose of providing a certain population density of crystal growth sites for the purpose of imparting readily identifiable characteristics to the crystals being manufactured.

A similar seeding process is described in U.S. Pat. No. 3,832,157 to KJELL et al whereby metal powders are formed directly by formation on seed crystals in a gaseous medium. The "seed crystals" in this process can be selected from such diverse materials as hydrogen gas, metal powders, or metal carbides. This process, too, is for the purpose of achieving the desirable number of crystal-growth sites and, thereby, a properly sized powder.

In the invention described below, it is to be emphasized that the seeding technique is utilized primarily to change the character, not of the crystal grown on the seed, but of decomposition products of the crystal. Moreover, it is not merely the observable characteristics of these metal-bearing decomposition products that are favorably affected: it is such esoteric properties as the catalytic and magnetic capabilities of the decomposition products that are enhanced.

SUMMARY OF THE INVENTION

Therefore, it is an object of the present invention to provide an improved process for making metal-bearing materials, especially particulate materials, whereby the material is formed by the degradation of an organometallic salt.

Another object of the invention is to provide a process for improving the magnetic properties of ferromagnetic metal particles.

A further object of the invention is to provide metal particles of improved chemical properties, thereby improving their useful life as catalysts, or as memory-retaining materials in magnetic-information-storing systems.

Other objects of the invention are to provide novel magnetic and catalytic particles.

Another object of the invention is to provide (1) a process for coating substrates with a functional, e.g. catalytic, metal surface and (2) the novel products formed by such a process.

Other objects of the invention will be obvious to those skilled in the art on their reading of this disclosure.

The above objects have been substantially achieved by the discovery that the selective heterogeneous seeding of the growth of an organometallic salt with a first crystalline salt will result in the primary growth of a second organometallic salt in a crystal lattice which, on decomposition, will yield markedly improved metal-bearing materials.

The improvement sought in the invention will be such as, first, to impart a different crystal pattern to the organometallic salt oxalate product than it will assume if it is grown in the particular environment without seeding; and, next, to convert the organometallic salt crystal to the metal in such a way that the modification in salt morphology attained by the seeding process is manifested by improved properties of a resultant metal-bearing material.

In many cases, the exact causes of the improvement in metal production cannot be accurately traced, even in hindsight, from the morphology. This is usually the case when the products exhibit some chemical attribute such as improved corrosion resistance or catalytic behavior. In magnetic applications, it is believed a substantial part of the improvement is due to obtaining a better-shaped, i.e. more acicular, particle in the magnetic sense. For example, nickel-bearing, ferromagnetic particles can be prepared by the process of the invention which are much improved over the materials of the prior art.

In other cases, the seeding procedure allows an improved spatial distribution of a catalytic support and a catalytic material such as a catalytic metal. For example, such a material can be formed by thermal reduction of a metal oxalate crystal formed on a core of aluminum oxalate (which will decompose to alumina) and with it or in it, oxalate, which will decompose to nickel metal. It appears that improved oxides for catalysts can be made by the process of the invention; this is believed to be, in part, due to changes attributed to seeding of the growth of organometallic salt which are precursors to the oxides, and a consequent advantageous crystalline structure thereof.

In carrying out the process of the invention, the following are typical of the metal salts that can be utilized and which lend themselves to thermal degradation to metal-bearing products, e.g. to the metal or metal oxide; Formates, oxalates, phthalates, succinates, acetates, malonates, and the lower alkyl homologues thereof. Oxalates are relatively inexpensive to make and have been the system of choice for most workers in this field, although some have suggested formates to be more desirable for some purposes.

Among the metals which are conveniently formed using the process of the invention are nickel, iron, cobalt, copper, ruthenium, platinum, palladium, rhodium, osmium, tin, lead, iridium, gold, silver, manganese, cadmium, indium, thalium and the like. These same metals can be fired to obtain oxides.

Other metals such as zinc, aluminum, cerium, magnesium, chromium, all of Group IIA metals, the rare earths, thorium, gallium and the like can be decomposed into oxide particles.

It is to be understood that the salts to be decomposed can be formed to comprise a plurality of metals, and consequently, to reduce to an alloy of such metals. Also, intimate combinations of metals and oxides can be formed on degradation of the salt. These aspects of the invention are essentially independent of the use of a seed. Combinations of metal can be achieved by introducing significant portions of at least two metals in the seed, and indeed, this is often advantageous.

ILLUSTRATIVE EXAMPLES OF THE INVENTION

It is, of course, to be understood that the following examples are intended to be illustrative and that numerous changes can be made in the reactants, proportions, and conditions set forth therein without departing from the spirit of the invention as defined in the appended claims.

EXAMPLES 1 – 3

Three metal-containing solutions were prepared as follows:
1. 27.8 grams $FeSO_4 \cdot 7H_2O$ in 200 ml water
2. 29.0 grams $Co(NO_3)_2 \cdot 6H_2O$ in 200 ml water
3. 29.0 grams $Ni(NO_3)_2 \cdot 6H_2O$ in 200 ml water For each metal-containing solution, a solution of 25.2 grams of oxalic acid dihydrate in 400 ml of water was prepared in a 1000 ml baffled Erlenmeyer flask equipped with a magnetic stirring bar. Then each of the resultant metal-containing solutions was added to a flask to form three different seed-bearing dispersions.

These resultant dispersions of minute oxalate particles were identified as Seed Dispersions Nos. 1, 2 and 3 respectively.

Thereupon three precipitating solutions of 25.2 grams of oxalic acid dihydrate in 400 ml of deionized water were prepared each in a different baffled 1000 ml Erlenmeyer flask. A quantity of 100 ml of each Seed Dispersion was mixed into a different precipitating solution. Thus, each of the three precipitation solutions now comprised effective quantities of seed dispersions No. 1, 2 and 3, respectively.

Next, three metal-bearing solutions were prepared as follows:

|  | 1 | 2 | 3 |
|---|---|---|---|
| $FeSO_4 \cdot 7H_2O$ | 1.4 | 6.0 | 6.0 |
| $Co(NO_3)_2 \cdot 6H_2O$ | 18.0 | 13.2 | 18.0 |
| $Ni(NO_3)_2 \cdot 6H_2O$ | 6.0 | 6.0 | 1.2 |
| Water | 200 | 200 | 200 |

Each metal-bearing solution was added slowly to the correspondingly precipitating solution bearing the correspondingly-numbered seed. This addition was carried out over a period of five minutes with the agitator running at full speed. The three crystal products were filtered, washed with hot water, dried by washing in isopropanol and coated with a polyamide resin available commercially from AZ Products, Inc. under the Trademark AZAMIDE 325. The resin which was applied in about a 5% solution of isopropanol. The resin was coated in a quantity of resin equivalent to 2.3% by weight based on dry oxalate. The oxalate was dried.

The three resultant oxalate crystal were placed into different compartments of a boat and reduced in a tube furnace at 800°F with a 2.4 liters/minute dry nitrogen passing over the sample. The tube was cooled to room temperature and exposed to a 3% $O_2$, 97% $N_2$ atmosphere for 3 hours. Then they were exposed to dry air for another hour.

The resultant products were three metal powders primarily comprised of an alloy of cobalt, nickel and iron.

The three metal powders had the following properties as follows:

| Sample<br>Seed Element | 1<br>Fe | 2<br>Co | 3<br>Ni |
|---|---|---|---|
| Sigma, em$\mu$/gram | 154 | 153 | 154 |
| Coercivity | 422 | 512 | 608 |
| Squareness | 0.56 | 0.74 | 0.68 |
| Bulk Density | 0.3 | 0.3 | 0.2 |
| Surface $M^2/g$ | 39.3 | 25.4 | 37.2 |

The sigma values confirm the fact that the metal content of each sample is substantially the same.

It should be noted that the metal of Sample 2 (cobalt-seeded) had the superior squareness and is most suitable for magnetic tape applications.

The metal of Sample 1 (Iron-seeded) has lower squareness, but has greater surface area for catalytic applications.

The metal of Sample 3 (Nickel-seeded) has the most porous structure as judged by scanning electron microscope photos and low bulk density. Thus, it is most favorable for catalytic work for in which large molecules are accommodated within the pores of this material. Such pores are believed to be on the order of 40–160 angstroms in effective diameter.

Figure 1:
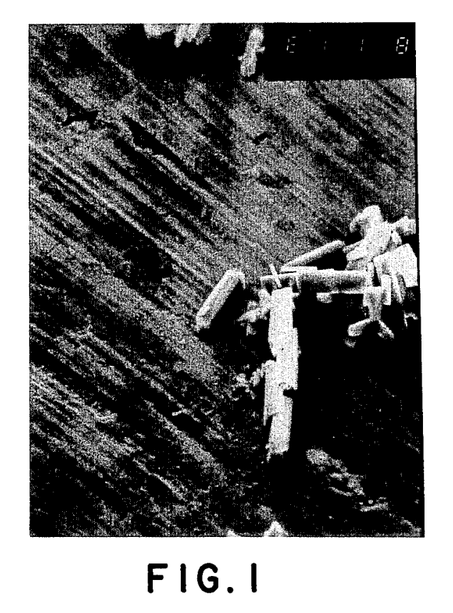
Figure 2:
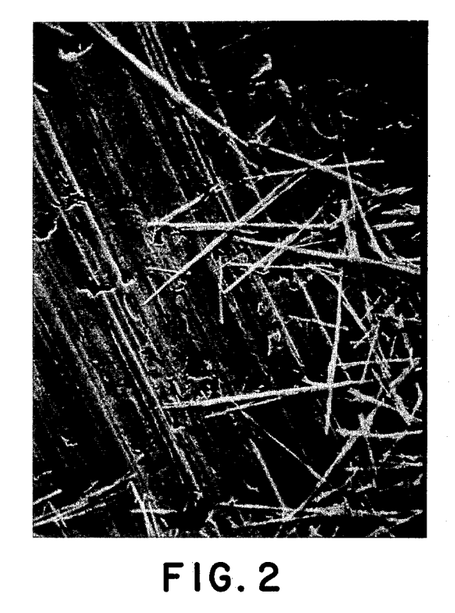
Figure 3:
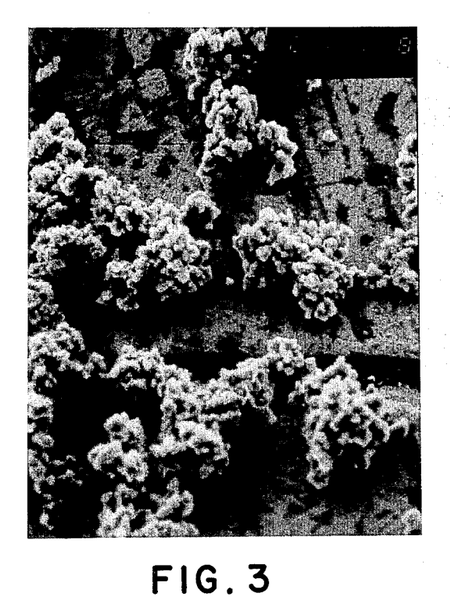

FIGS. 1–3 show, at 2,000 magnification, samples of the oxalate produced in Examples 1–3 as follows:
FIG. 1: with iron seed
FIG. 2: with cobalt seed
FIG. 3: with nickel seed It should be noted that all of these oxalates comprise the same 60:20:20 ratio of cobalt: nickel: iron.

These photographs were obtained with the aid of a scanning electron microscope.

EXAMPLE 4

Using the same general procedures disclosed in Examples 1–3, a copper- oxalate seed was used to initiate growth of an equant particle composed of a second organometallic salt of the 60:20:20 cobalt:nickel:iron type. Copper, all appearing in the seed portion, equalled 1½% of the total metal in the completed oxalate.

The reduced oxalate product was an equant metal powder exhibiting a squareness of 0.5. Such a powder finds particular application in magnetic disc storage devices.

Figure 4:
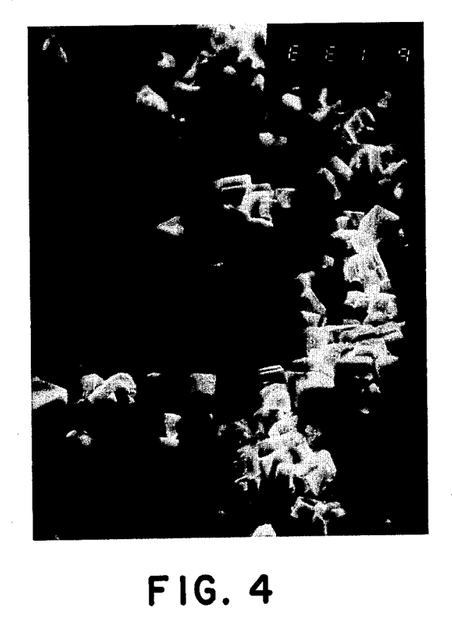

FIG. 4 is a photograph (EMS) of such a copper seeded oxalate. (FIG. 4 is not the oxalate of Example 4, the pictured oxalate is larger and was grown to facilitate obtaining a picture at magnification of 3000; the FIG. 4 oxalate is of essentially the same shape as the illustrated salt.)

EXAMPLE 5

A particularly advantageous aspect of the invention is the use thereof in attaching metal-bearing materials to surfaces. This procedure is of particular value in attaching catalytic metal to catalyst-support surfaces. There are a large number of advantages to such support: For example, the catalyst can be deposited as a thin layer on a substrate which serves as a heat-conductor for use in exothermic or endothermic reactions. There are many other occasions wherein the support of a catalyst on a surface is required.

A coupon of 304 stainless steel sheet, 1 inch × 3 inch × 20 gauge, was cut out. The sample was cleaned in water, then in tetrahydrofuran. The coupon was then vapor degreased in tetrahydrofuran vapor and immersed in a beaker containing 600 ml of water and 150 grams of oxalic acid dihydrate. The surface was sanded with 60-grit carborundum paper while under the oxalic acid solution. The beaker was then placed on a stirring hotplate and a magnetic stirring bar added. The contents were heated to boiling and allowed to boil for 1 hour. (The oxalic acid completely dissolves as the temperature rises.) The heat was then turned off, and the sample allowed to stand at about 70°F for 70 hours. (The corrosion rate of 304 stainless steel in hot oxalic acid solution is given in the literature as greater than 50 mils per year.)

A solution was prepared containing 30 grams of cobalt nitrate hexahydrate in 200 mil of water. To this was added, slowly and with vigrorous stirring, 10 grams of oxalic acid in 200 ml of water. No precipitate resulted.

The stainless steel coupon was then removed from the oxalic acid solution and immediately dipped into the cobalt-bearing solution. After 20 minutes, the oxalic acid solution was added dropwise to the cobalt-bearing solution at a rate of 0.2 ml per minute until the solution first shows signs of becoming cloudy. Addition of the oxalic acid was stopped and stirring continued for 1 hour.

The coupon was removed and rinsed in distilled water. It was covered with a tightly bonded layer of cobalt oxalate.

Figure 5:
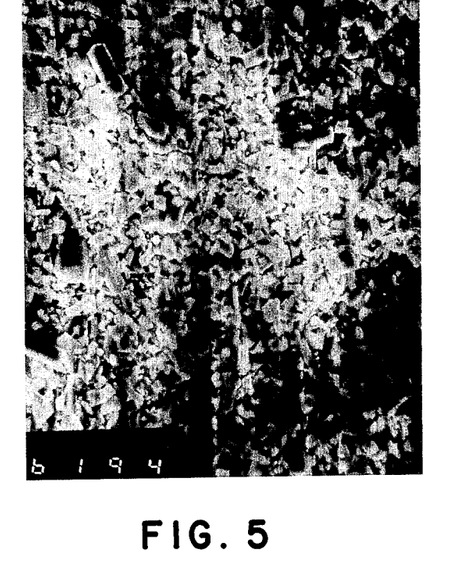

A portion of the coupon was photographed by electron scanning microscopy (ESM) and found to be covered with a myriad of rhombic crystals 1 micron diameter by 6 microns long. FIG. 5 is an ESM photograph thereof at 2000 magnification. The layer was about 2 mils thick by micrometer measurement. The slip was then placed in a tube furnace and the cobalt reduced to metal powder at 700°F in 10% hydrogen gas mixed with nitrogen. The tube was cooled to room temperature, purged with 3% $O_2$ in $N_2$ for 30 minutes, then with dry air for 10 minutes. The coupon was examined. The oxalate layer had become a tightly adhered black powder indicating its conversion to metal. This layer was not removed by an 80 psi air jet. Under the microscope, it was found that the cobalt layer could be removed only by scraping with dental tools.

This material was active as a catalyst in hydrogenation and particularly in the manufacture of alkanes, including methane and ethane from water gas.

The above Example illustrates a product comprising an inorganic support surface (steel) bearing a thin layer of organometallic salt of a catalytic metal which salt is bonded to the support surface by its growth on a pre-existing salt structure. This pre-existing salt structure is formed by reaction of an acid with a metal (say iron) of the inorganic support structure. The thin layer of organometallic salt is decomposed to form a catalytic metal. The catalytic metal is adherently bonded to the substrate by an intermetallic bond formed of the reduction product of a mixed organometallic salt comprising metals of said substrate and catalytic metal.

EXAMPLE 6

Example 5 is repeated utilizing an iron oxalate layer rather than a cobalt oxalate layer. Iron catalyst is successfully attached to the metal.

EXAMPLE 7

Example 5 is repeated utilizing a nickel oxalate layer. Catalytic nickel is successfully attached to the metal.

EXAMPLES 8–20

The procedure of Example 5 is repeated with all the following metals, thereby attaching catalytic cobalt thereto.

| | |
|---|---|
| 8. Aluminum | 15. Monel |
| 9. Chlorimet | 16. Nickel |
| 10. Bronze | 17. 316 Stainless Steel |
| 11. Copper | 18. 12% Cr Stainless |
| 12. Durimet 20 | 19. 17% Cr Stainless |
| 13. Iron | 20. Mild Steel |
| 14. Lead | |

It was concluded that the criteria for selecting a suitable inorganic substrate were (1) susceptibility to reaction with the acid utilized in forming the organometallic seed crystal and (2) formation of an insoluble organometallic salt by the metal and the acid of choice. Oxalic acid appears to be particularly versatile.

Non-metallic substrates such as alumina and iron oxide have also been used as substrates for metal deposition. In the latter case, because the iron oxide tends to dissolve in hot oxalic acid, it was dumped into cold solution. Pyrogeric silica can be used as a substrate; e.g. by boiling oxalic acid for three days before reading with the coating-metal solution.

EXAMPLE 21

This illustrates the versatility of the process of Examples 5–20.

Example 5 is repeated. The resulting cobalt surface is then used as a substrate for copper oxalate prepared according to the general procedure of Example 5, then; the copper oxalate is reduced to copper.

In each of the foregoing samples, the surface coatings are not planar but have a generally irregular surface and, moveover, are highly porous, thereby enhancing their useful surface area.

EXAMPLE 22

Example 5 is repeated, but a mixed nickel-magnesium oxalate is placed on the cobalt sublayer. Care is taken to keep the concentration of the magnesium-nickel salt solutions rather low. When the mixed oxalate is reduced it forms an extraordinarily intimate deposition of nickel metal or magneisum oxide.

EXAMPLE 23

An interesting example is shown here which has the advantages of cobalt crystal shape (high squareness and Hc) with the advantage of the alloy (high sigma and corrosion resistance).

A first solution of 25.2 grams oxalic acid dihydrate, 150 grams Karo syrup, 150 grams ethanol and 150 grams of deionized water was formed. This solution was in a 1000 ml baffled Erlenmeyer flask which was equipped with a magnetic stirring bar. Slowly added was a second solution containing 17.4 grams of Co$(NO_3)_2$.$6H_2O$, 25 grams of dextrose syrup of the type sold in grocery stores under the KARO trademark, 25 grams ethanol, and 25 grams of water. A very thick pink suspension of seed crystals resulted. A third solution was then added to the mixture, it contained 2.9 grams of nickel nitrate hexahydrate, 8.3 grams FeSO$_4$.$7H_2O$ dissolved in 25 grams Karo, 25 grams ethanol, and 25 grams of water. The stirring was continued for 10 minutes, then the suspension was filtered, washed with 600 ml hot water, and rinsed with acetone. The sample dried, weighed, then slurried in isopropanol. An amount of polyamide resin was coated on the resulting salt. The polyamide is that available from AZ Products, Inc., of Eaton Park, Florida under the trademark AZAMIDE 325, equal to 2.3 percent by weight was added. The sample was placed in a compartment of a sample boat, then placed in a tube and reduced to the metal. The gas phase was nitrogen at 2.4 liters/minute at 700°F. The tube was cooled to room temperature and treated for 3 hours with 3% $O_2$, then for 1 hour in dry air. Analysis shows:

| | |
|---|---|
| Magnetic Moment | 189 em$\mu$/g |
| Coercive Force | 1054 oe at 20°C. |
| | 1275 oe at −100°C. |
| Squareness | 0.81 |
| Surface Area | 31.8 M$^2$/g |

A second sample of the oxalate was reduced at 750°F. in nitrogen. It showed:

| | |
|---|---|
| Magnetic Moment | 186 em$\mu$/g |
| Hc | 896 oe |
| Squareness, about | 0.86 |

Apparently it is advantageous to have all the cobalt in the seed. So placing it does not interfere with coercive force and squareness and has no deleterious effect on corrosion or magnetic moment.

EXAMPLE 24

This example describes a catalyst having particular value in conversion of carbonaceous materials, e.g. coal to hydrocarbon fuel gases. A particularly valuable aspect of the catalyst is its ability to produce a relatively large quantity of ethane.

The catalyst was prepared as follows: A first solution was formed of 3200 ml of a cobalt nitrate solution (aqueous) containing 15 percent cobalt by weight; 7300 grams of citric acid; 1740 mls of a 67% sucrose solution (aqueous); 3306 ml of deionized water; and 2884 ml of denatured ethyl alcohol.

A second solution was made of 2328 grams of oxalic acid dihydrate in 5220 ml of 67 percent sucrose solution; 6920 ml of deionized water and 8720 ml of denatured alcohol.

These two solutions were pumped at rates of 230 ml/minute and 345 ml/minute respectively, into a ⅛-inch stainless steel T coupling and through seven feet of ¼-inch (i.d.) tubing into a receptacle. A very thick pink dispersion of cobalt oxalate crystals resulted. This dispersion will be called a "seed" mixture.

Thereupon an iron-bearing solution was prepared by dissolving 6.25 lbs of ferrous sulfate crystals, containing 20.09% by weight of iron in 101 lbs of water, with 0.5 lb of citric acid, 10 grams of sodium sulfate.

A metal-bearing solution was then prepared containing 12 lbs of cobalt nitrate solution (15% cobalt by weight); 7.125 lbs of nickel nitrate solution containing 12% by weight of nickel; 53 lbs of iron-bearing solution as described above and 93 lbs of water.

An oxalic acid solution was prepared by dissolving 16 lbs of oxalic acid dihydrate in 270 lbs of water. When the solution of the oxalic acid was complete the seed solution was added thereto.

The metal solution is sprayed, at a rate of 3.7 gallons per hour, with a baffled and very well agitated mixer holding the seed dispersion. After the precipitation has been completed, it is filtered in a pressure filter, and the cake washed with 50 gallons of hot (70°C) water. Nitrogen forces excess water from the filter cake. The cake is then washed with 15 gallons of isopropanol (IPA). Excess IPA is removed by passing nitrogen through the filter cake. The cake is removed from the filter and slurried with one pound, nine ounces of polyamide resin solution containing 25% by weight of solids. The material is spray dried in a Bowen Engineering dryer at 200°F inlet air temperature and about 0.5 volume percent isopropanol in the vapor. A sample of this dry powder weighing 30 grams was charged into a tube furnace. It was reduced to metal in an atmosphere containing 5% hydrogen, 600°F, until the $CO_2$ and water in the vent gas were less than 0.02% by volume. The gas flow rate was set at 2.5 liter per minute. The tube was then cooled to room temperature with a 0.2 liter per minute nitrogen flow. Next 3% $O_2$ in 97% $N_2$ is added at a low flow rate. After 3 hours, the tube is purged with dry air for 1 hour and opened.

The powder was analyzed for its magnetic and physical properties.

Surface area was measured by the $N_2$ absorption method of Brunauer Emmet and Teller (B.E.T.) and found to be 61 square meters per gram.

The specific magnetic moment was measured by a vibrating sample magnetometer at 5000 oersteds applied magnetic field and found to be 167 emu/gram.

The coercive force and squareness were measured on a 60 cycle magnetic loop tester, or BH meter. At 3000 oe applied magnetic field, the coercive force was found to be 753 oe. At 1500 oe applied magnetic field, the squareness was found to be 0.83. Both BH values are for the sample dispersed in linseed oil, 3 ml of oil being used per gram of powder.

The bulk density was measured by dumping 50 ml of powder into a tared graduated cylinder. The powder was found to weigh 6.000 grams, or 0.12 grams/ml.

The particle density was found by a Beckman air comparison pycnometer to be 7.7 grams/cc. The sample was dried under helium gas at 170°F for 6 hours. The sample was then transferred into a $N_2$ filled glove box containing the pycnometer. The measurement was made in dry pure nitrogen gas to avoid absorption errors.

A second tube furnace run was made the same as this first run, but dumped into Freon TF prior to catalyst testing.

Some catalyst testing was of particular interest and resulted in the discovery that water gas (a mixture of CO and $H_2$) could be converted quantitatively to alkanes with a particularly favorable amount of ethane being produced.

While the present invention does not depend for its operatability on the below described inventions, they can be utilized, together or separately, in conjunction with the invention primarily defixed therein and, in general, optimum performance is achieved when the invention of the disclosure is carried out using one or more of the following procedures.

COATING OF EHRREICH-RETI:

This is a procedure whereby organometallic salts are coated with an organic film-forming resin before being subjected to thermal degradation. The organic material is advantageously in the range of from 1 to 15% by weight of the organic salt being reduced and any decomposition residue is preferably less than 5% of the metal content of the salt. Most desirable are polymers that liquify during the decomposition of the oxalate and before they reach their ultimate state of decomposition. Polyamides are particularly desirable for use with cobalt-bearing particles but polyurethane, epoxy and silicone coatings are illustrative of the broad spectrum of coatings that can be used.

COMPLEXING PROCEDURES OF DEFFEYES-TYLER:

This is a procedure whereby a complexing agent, perhaps through a rate-controlling or stereochemical phenomena, is used to initiate the precipitation of modify the growth of the organometallic salts.

Indeed, when used to produce acicular organometallic salts such as oxalates comprising a major portion of cobalt in the metal portion thereof, it has been found that the crystalline arrangement of the salt provides, upon suitable reduction to the metal, very substantial improvements in the magnetic properties of the metal. Surprisingly, the highly acicular properties of the initial precipitate (which we may call a seed) are transmitted to the organometallic salt grown from the seed and also to the metallic powder reduced from this organometallic salt. This appears in the first instance at least, due to growth of a fasces-like organometallic salt which can "splinter" on reduction. The improvements in ferromagnetic metal powders include extremely high squareness ratio of the hysteresis loop, and low DC noise, and high magnetic output from tapes produced therefrom. Such metal particles, when compared to their counterparts formed by the most favorable prior art procedures, also exhibit improved chemical stability; improved switching fields characteristics; improved coercive force, sigma value and squareness as a combination of properties; and an important improvement in the temperature dependence of the coercive force. The latter improvement is believed to be caused by the relative dominance of shape anisotropy over crystalline anisotropy.

In one embodiment of that invention, the initial precipitation of seed crystals takes place in the same medium in which the primary growth of organometallic salt is to occur. In such a situation, it is usually desirable to utilize a liquid medium wherein the solubility of the organometallic salt is less than its solubility in water. This is conveniently achieved by adding an organic solvent to the water. Such water-soluble solvents as acetone, lower alkyl alcohols like ethanol, and the like, are entirely satisfactory, and those skilled in the art can select many other such readily available solvents for use if they wish to do so.

In another embodiment, seed crystals may be formed in a first medium containing the complexing agent and, advantageously, a water-solvent medium and then transferred to the primary crystal-growing solution. One advantage of this latter procedure is that, when the complexing agent is properly selected, the population density of seeds or seed-promoting complexes in the first medium can be so high that a very small volume of the medium containing the seeds or seed-promoting complex can be used to initiate the growth of crystals in the primary crystal-growing solution. This is true even when the medium for the primary crystal-growing step is entirely aqueous. Thus, it is seen that this embodiment can be carried out using a relatively small amount of organic solvent and complexing agent.

It is possible, of course, for the complexing agent to act as a solubility-limiting material also. Indeed ethylene glycol is illustrative of one compound that is advantageously utilized in such a dual role.

The term complexing agent herein is used to cover chemical compounds which associate with metal ions in the reaction solution. Cobalt's tendency to form such associations is well known. The association may be via coordinate bonds, hydrogen bonds, or other such forces; the resulting compound may be looked at as a coordination complex, a chelate or more particularly described by some other terminology. Among the useful complexing agents are organic compounds such as polyhydroxy compounds including sugars, hydroxy carboxylic acids, dicarboxylic acids, and the like. The amino and hydroxy carboxylic acids advantageously have an amine or hydroxyl group adjacent the carboxy group. Inorganic compounds can also be used. Those bearing the ammonium ion are easily utilized in suitable complex formation. For the purposes of the invention the particular metal complex should at least partly be dissociable in the reaction medium. There would be no point in permanently sequestering the metal to prevent its mobility to the embryonic seed crystal, nor would there be any point in dropping the metal out of solution in an insoluble complex precipitate. On the other hand, if the complex is so readily dissociable in the particular medium in which it is used that only an inoperable complex is existant, then the complexing agent or the medium must be changed to make the complexing agent useful. These considerations will be obvious to chemists reading this disclosure. However, they are made explicit here because of the physical impossibility of listing all of the solvent systems and complexing agents which could find use in the process of the invention.

Among complexing agents advantageously used in the invention are included such compounds as sugars, especially sugars like glucose, sucrose and the like; glycols such as ethylene glycol and the like; glycerine and the like. Dicarboxylic acid complexing agents, e.g. phthalic acid and the like, are also useful. Indeed, some of the more advantageous aliphatic complexing agents are such aliphatic acids as tartaric acid, citric acid and the like. Other such acids include glycolic, hydroxy lactones such as ascorbic acid, lactic, hydroxy-butyric, mandelic, glyceric, malic, and the like. Ethyl alpha hydroxy butyrate is believed to be another effective complexing agent as is ethylene diaminetetracetic acid. In general, the more advantageous organic complexing agents appear to be those with two or more hydroxy groups, two or more amino groups, a hydroxy group with an adjacent carboxyl group or an amino group with an adjacent carboxyl group. But other such sites can interact with a cobalt ion to form a complex as is known in the art. Using the above teachings, and the vast amount of pre-existing literature already known to the art and which relates to cobalt-complexing agents all skilled in the art will be able to select many additional complexing agents; all such materials, including such sometimes "chelating" agents as diethylene triamine, and the like are intended to be covered by the term "complexing agent" as used in this application.

The cobalt-bearing organometallic salts formed of carboxylic acids by the aforesaid complex-utilizing seeding procedure are characterized by great acicularity i.e. an elongate or needle-like shape. They tend to form in what appears to be elongate fasces which, on reduction to the metal, tend to splinter along the direction of the axis of the fasces and form elemental cobalt metal particles of a more highly acicular and ordered crystalline structure than has been achieved heretofore. Most important, it appears that this acicularity of shape also manifests itself in an improved dominance of shape anisotropy or crystalline anisotropy characteristics in magnetic behavior of the particles.

Anisotropy is the non uniformity, or directional dependence, of the magnetic properties. It is anisotropy that gives rise to the coercive force. Anisotropy can be caused by many different factors. In the kind of magnetic particles described herein, the dominant anisotropy factors are shape anisotropy and crystalline anisotropy. Shape anisotropy arises from the particle being unequal in length and diameter. Particles with high shape anisotropy are desirable because they can be oriented in a magnetic tape system and because their magnetic properties are not substantially influenced by changes in temperature. Crystalline anisotropy relates to anisotropies in the crystalline structure of the magnetic particle. The coercive force of a particle which derives its magnetic properties from crystalline anisotropy will change as about the 10th power of the absolute temperature. Thus, the crystalline anisotropy can be distinguished from shape anisotropy by measuring the coercive force at room temperature and at some reduced temperature. Measurements made at about 25°C and at liquid nitrogen temperature reveal the products of the instant invention to have unusually stable magnetic properties over a broad range of temperatures.

What is claimed is:

1. In a process for making metal-bearing powders comprising the formation of an organometallic salt and the subsequent decomposition of said salt to a said metal-bearing powder, the improvement comprising the steps of
   1. reacting a carboxylic acid with a first metal reactant to form an organometallic salt seed,
   2. reacting a carboxylic acid with a second metal reactant, in a liquid medium with said first carboxylic salt, and growing a second organometallic salt material on said seed, said seed causing a modification in the normal growth pattern of said second salt,
   3. recovering a solid organometallic salt product comprising both said seed and said second organometallic salt, and
   4. decomposing said salt product to a metal-bearing powder.

2. A process as defined in claim 1 wherein said seed is needle-like in shape and forms means to modify the morphology of said second salt such that, on reduction, to a metal which is derived from said second metal reactant, the magnetic properties of said metal are substantially enhanced over said properties achievable when said seed crystal is not utilized.

3. A process as defined in claim 2 wherein said seed comprises, as its primary metallic component, cobalt.

4. A process as defined in claim 2 wherein said second organometallic salt material contains cobalt, iron and nickel.

5. A process as defined in claim 2 wherein said second organometallic salt material contains iron and nickel.

6. A process as defined in claim 1 wherein at least one of said organometallic salts is an oxalate.

7. A process as defined in claim 3 wherein at least one of said organometallic salts is an oxalate.

8. A process as defined in claim 1 wherein said metal-bearing powder is a ferromagnetic metal.

9. A process as defined in claim 2 wherein said metal in said first metal reactant is cobalt, and said second metal reactant comprises nickel.

10. A process as defined in claim 2 wherein said seed is equant in shape and forms means to modify the morphology of said second salt such that, on reduction, to a metal which is derived from said second metal composition, the magnetic properties will have a squareness value of about 0.5.

11. A process as defined in claim 10 wherein said second metal is predominantly cobalt.

12. A process for attaching a porous metal-bearing material to an inorganic metal-bearing catalytic support comprising the steps of
   a. reacting said support member with a carboxylic acid to form a first organometallic salt of a metal component of said support material and said carboxylic acid, b. growing a second organometallic salt on said first salt, said second organometallic material comprising a catalytically active metal component, and c. reducing both said organometallic salts to said metal-bearing material, thereby bonding said catalytically active component to said inorganic catalytic support.

13. A process as defined in claim 12 wherein said support is steel and said acid is oxalic acid, and wherein said porous metal is a cobalt-bearing alloy.

14. Organometallic salt crystal product formed of a nucleus of a seed crystal component comprising a first metal composition and 2) a second organometallic salt component of a different metal composition grown on said nucleus, the morphology of said seed crystal dominating the morphology of the salt crystal product, said product being formed by a process comprising the steps of 1. reacting a carboxylic acid with a first metal reactant to form an organometallic salt seed, 2. reacting a carboxylic acid with a second metal reactant, in a liquid medium with said first carboxylic salt, growing a second organometallic salt material on said seed, said seed causing a modification in the normal growth pattern of said second salt, and 3. recovering a solid organometallic salt product comprising both said seed and said second organometallic salt.

15. A salt product as defined in claim 14 wherein said product is a needle-like in shape.

16. A product as defined in claim 15 wherein said crystal comprises, as its primary metallic component, cobalt.

17. A product as defined in claim 15 wherein said product comprises nickel, cobalt and iron.

18. A product as defined in claim 14 wherein said salt is a metal oxalate.

19. A product as defined in claim 15 wherein said salt is a metal oxalate.

20. A product as defined in claim 16 wherein said salt is a metal oxalate.

21. A product as defined in claim 18 wherein said salt is a metal oxalate.

22. A product comprising an inorganic support member and a thin layer of an organometallic salt catalytic metal-bearing material thereon, said salt being decomposable to catalytic metal and being bonded to said support member by growth on a salt structure which is the reaction product of an acid and the inorganic support structure, said product being formed by a process comprising the steps of a. reacting said support member with an acid to form a first salt of a metal component of said support material and said acid, b. growing a second salt on said first salt, said second material comprising a catalytically-active metal component, and c. reducing both said salts to said metal-bearing material, thereby bonding said catalytically-active component to said inorganic support.

23. A product as defined in claim 22 wherein said inorganic support surface is steel and said organometallic salt is an oxalate.

24. A product as defined in claim 22 wherein said catalytic metal is selected from the group of metals comprising iron, nickel, cobalt or alloys bearing one of said metals.

25. A product comprising an inorganic support surface and a thin layer of catalytic metal-bearing material thereon, said metal adherently bonded thereto by an intermetallic bond with said substrate formed of the reduction product of a mixed salt comprising metal of said substrate and catalytic metal, said product formed by a process comprising the step of a. reacting said support member with an acid to form a first salt of a metal component of said support material and said acid, b. growing a second salt on said first salt, said second material comprising a catalytically-active metal component, and c. reducing both said salts to said metal-bearing material, thereby bonding said catalytically-active component to said inorganic support.

26. A product as defined in claim 25 wherein said salt is formed of a carboxylic acid.

27. A product as defined in claim 15 wherein said seed crystal is a reaction product of cobalt and a carboxylic acid and wherein said different metal composition is such that a ferromagnetic metal product is formed on reduction of said salt crystal product.

28. A product as defined in claim 22 wherein said salt is formed of a carboxylic acid.

29. A process as defined in claim 12 wherein said catalytic metal is a nickel-bearing metal.

30. A process as defined in claim 12 wherein said catalytic metal is an iron-bearing metal.

* * * * *

UNITED STATES PATENT OFFICE
CERTIFICATE OF CORRECTION

Patent No. 3,965,046          Dated June 22, 1976

Inventor(s) Robert J. Deffeyes, Arlington, Texas

It is certified that error appears in the above-identified patent and that said Letters Patent are hereby corrected as shown below:

Column 4, line 34, after 'crystal' change "were" to --was--;

Column 7, line 26, change "or" to --on--; and

Column 9, line 61, change "of" to --or--.

Signed and Sealed this

Nineteenth Day of October 1976

[SEAL]

Attest:

RUTH C. MASON
*Attesting Officer*

C. MARSHALL DANN
*Commissioner of Patents and Trademarks*